United States Patent [19]

Chai et al.

[11] Patent Number: 5,118,919
[45] Date of Patent: Jun. 2, 1992

[54] WELD METAL ALLOY FOR HIGH YIELD STRENGTH AND METHOD OF DEPOSITING SAME

[75] Inventors: Chang-Shung Chai, Highland Heights; David A. Fink, University Heights; John Gonzalez, Willoughby, all of Ohio

[73] Assignee: The Lincoln Electric Company, Cleveland, Ohio

[21] Appl. No.: 501,167

[22] Filed: Mar. 29, 1990

Related U.S. Application Data

[63] Continuation-in-part of Ser. No. 495,696, Mar. 19, 1990, Pat. No. 5,055,655, which is a continuation-in-part of Ser. No. 405,727, Sep. 11, 1989, Pat. No. 5,003,155.

[51] Int. Cl.⁵ .................................. B23K 9/23
[52] U.S. Cl. ................... 219/137 WM; 219/146.22
[58] Field of Search ............... 219/146.23, 146.24, 219/146.22, 146.32, 137 WM, 146.1

[56] References Cited

U.S. PATENT DOCUMENTS

| | | | |
|---|---|---|---|
| 3,318,729 | 5/1967 | Siegle | 117/202 |
| 3,769,491 | 10/1973 | DeLong et al. | 219/137 WM |
| 3,867,608 | 2/1975 | Ohwa et al. | 219/73.1 |
| 3,868,487 | 2/1975 | Ito | 219/73 |
| 4,029,934 | 6/1977 | Clark et al. | 219/146.24 |
| 4,071,734 | 1/1978 | Zarechensky | 219/146.31 |
| 4,251,711 | 2/1981 | Tanigaki et al. | 219/146.24 |
| 4,443,406 | 4/1984 | Sukekawa et al. | 219/146.23 |

FOREIGN PATENT DOCUMENTS

| | | |
|---|---|---|
| 289357 | 11/1966 | Australia . |
| 407227 | 4/1969 | Australia . |
| 414173 | 5/1969 | Australia . |
| 423107 | 6/1969 | Australia . |
| 416808 | 12/1970 | Australia . |
| 439774 | 1/1972 | Australia . |
| 451653 | 4/1972 | Australia . |
| 484159 | 7/1975 | Australia . |
| 27965/77 | 12/1979 | Australia . |
| 0417546 | 8/1990 | European Pat. Off. . |
| 1190597 | 4/1965 | Fed. Rep. of Germany . |

OTHER PUBLICATIONS

Article; "A Fluoroplastic Material in Flux-Cored Strip to Reduce the Hydrogen Content of Deposited Metal", Author: V. V. Chigarev and A. V. Ostroushko, Magazine: Avt. Svarka, 1985, No. 1, pp. 45–47.

*Primary Examiner*—Clifford C. Shaw
*Attorney, Agent, or Firm*—Body, Vickers & Daniels

[57] ABSTRACT

In a consumable welding element for depositing a weld metal bead onto a steel workpiece with the diffusible hydrogen in the weld metal being less than 2.0 ppm, the oxygen of the weld metal being less than 0.040% by weight and the yield strength of the weld metal being greater than about 85,000 psi, there is provided an improvement wherein the weld metal is a steel alloy including, as a percentage by weight of the weld metal, 0.03–0.09% carbon, 2.5–4.0% manganese, 0.01–0.05% titanium, silicon less than about 1.0%, nickel less than about 2.0%, and oxygen less than about 0.035%.

34 Claims, 4 Drawing Sheets

WELD METAL ALLOY FOR HIGH YIELD STRENGTH AND METHOD OF DEPOSITING SAME

This application is a continuation in part of pending application Ser. No. 495,696, filed Mar. 19, 1990 which is, in turn, a continuation in part of pending application Ser. No. 405,727, filed Sep. 11, 1989 now U.S. Pat. No. 5,003,155.

INCORPORATION BY REFERENCE

As background information relating to an electrode to which the present invention is specifically directed, prior applications Ser. No. 495,696 filed Mar. 19, 1990 now U.S. Pat. No. 5,055,655, and Ser. No., 405,727, filed Sep. 11, 1989 now U.S. Pat. No. 5,003,155, are incorporated by reference herein so that this material need not be repeated in this application.

DISCLOSURE

The present invention relates to an improved weld metal alloy for high strength workpieces and a method of depositing this weld metal alloy by arc welding. This alloy is formed from a consumable welding element, such as an electrode, that is used to MIG weld high strength metals, of the type demanded in certain military and industrial applications. The invention will be discussed with respect to this application. The welding element or electrode used to form the alloy of this invention is a solid or cored metal electrode which can deposit, with a welding heat input of less than 130 kJoules/in, a weld metal bead onto a steel workpiece with a diffusible hydrogen in the weld metal being less than 2.00 ppm, the oxygen of the weld metal being less than 0.040% by weight of the weld metal and with a yield strength of the weld metal greater than about 85,000 psi, and preferably greater than 100,000 psi. The invention is particularly applicable for use in the out of position type of welding of the novel alloy onto a high strength workpiece with low to no preheat of the workpiece and to obtain yield strengths in the neighborhood of 120,000–140,000 psi.

As the yield strength of the workpiece metal increases to high strength levels, such as military specification HY-80, HY-100, and even HY-130, serious problems have been experienced in obtaining low cracking tendency and high impact or notch toughness, while maintaining the ability to weld out of position at high deposition rates. When welding these high yield strength steels such as steels exceeding HY-80 (80,000 psi), the consumable welding electrodes or other welding elements have heretofore normally taken the form of a solid wire with a diameter generally about 0.045 inches when welding out-of-position and a diameter generally about 0.062 inches for welding down hand applications. Welding high strength steels including and exceeding over HY-100 has been extremely difficult even with such solid MIG wire. There is a tremendous demand for producing a welding element that will provide a weld metal alloy on high strength steel workpieces, which alloy has a strength exceeding 85,000–100,000 psi while having a low tendency to crack and a high notch toughness.

In the two prior applications, incorporated by reference herein, applicants have disclosed an electrode which will deposit a weld metal having acceptable characteristics and which can be used at room temperature if the base metal itself is amenable to such room temperature welding. As is known, in many instances, the base metal must be preheated not for the characteristics of the deposited weld metal, but due to the characteristics of the workpiece metal itself. The welding element, or electrode, described in the prior applications produces a weld metal bead on the workpiece which has less than 2.0 ppm of diffusible hydrogen, less than 0.040% by weight of oxygen and a yield strength greater than about 85,000 psi, and preferably substantially greater than 100,000 psi. This type of electrode or welding element has been extremely successful in performing the task of producing high strength weld metal for use with high strength military steel. In some instances, a certain amount of preheat is required for the purpose of preventing cracking or other difficulties with the workpiece metal itself.

Having developed and perfected an advantageous welding element for arc welding high strength steels, attention has now been directed toward the optimization of this technology in a manner to define the specific alloy characteristics of the weld metal bead produced by the previously developed welding elements that gave high yield strengths in excess of 100,000 psi with a minimum amount of preheating, indeed with no preheating if not otherwise required due to limitations of the workpiece metal. In summary, the present invention relates to a weld metal alloy which can be deposited upon a high strength steel workpiece which has a notch toughness of a Charpy number greater than 40 at 0° F. Generally, as the yield strength of the weld metal alloy in the bead is increased by modifying its alloy content, the notch toughness is substantially decreased. By controlling the novel alloy system an acceptable high notch toughness is produced even at yield strengths substantially exceeding 130,000 psi. At a yield strength below 120,000 psi, the Charpy number at 0° F. substantially exceeds 50 and can exceed 65 or 70. Thus, by using the present invention to produce a desired alloy for the weld metal bead, notch toughness is maintained at a high level irrespective of the yield strength.

The second prerequisite of a sound weld bead is crack resistance. This is indirectly reflected by the elongation of the weld bead alloy metal. By providing the alloy constituents as defined in this invention and in accordance with the ranges forming the present invention, the percentage of elongation is generally greater than about 18%. At the high yield strength versions of the present invention used for the weld metal of the bead, the elongation is in the neighborhood of 18%; however, the elongation exceeds 18% as the yield strength of the weld metal alloy is decreased by a selection of the alloy material and the specific percentages forming the alloy of the present invention. Thus, the present invention is directed to an alloy for the weld metal deposited on high strength steel workpieces which has an exceedingly high yield strength while maintaining a high notch toughness and crack resistance. This inventive alloy maintains a good welding characteristic by using an electrode that both forms the novel alloy and provides a deposit with less than 2.0 ppm of diffusible hydrogen, less than 0.035% by weight of the weld metal of oxygen and a yield strength in excess of 85,000 psi. As an other feature of the present invention, the novel alloy is capable of being formed as a weld metal bead with a welding process employing welding heat input less than 130 kJoules/in. Prior attempts to obtain a high strength steel weld bead have required substantial preheat to the workpiece itself and a lower welding heat input welding procedure.

In accordance with the present invention, the improved weld metal alloy for the deposited weld bead is a steel alloy including, as percentages by weight of the weld metal, 0.03-0.09% carbon, 2.5-4.0% manganese, 0.01-0.05% titanium, silicon less than about 1.0%, nickel less than about 2.0%, and oxygen less than about 0.035%. By providing this alloy as the alloy for the weld metal, which also has the previously defined characteristics of diffusible hydrogen in an amount less than 2.0 ppm, extremely high strengths are obtained without the need for preheat and without diminishing the notch toughness or decreasing the crack resistance.

In accordance with another aspect of the present invention, the silicon in the alloy forming the weld metal is in the range of 0.2-0.6% by weight of the weld metal. The nickel is in the range of 0.8-1.8% by weight of the weld metal. In addition, the oxygen important feature of the present invention is that it does include a certain amount of oxygen in excess of 0.010% and preferably in excess of about 0.020%. The upper level for the included oxygen is about 0.035% and is less than about 0.040%.

The various alloying percentages and constituents of the weld metal have been determined to be, in combination, sufficient to obtain the desired high yield strength while producing relatively good mechanical properties. The invention includes the method of obtaining this particular, novel alloy composition of weld metal by an arc welding process and not by some special alloying procedure. The alloy is deposited with the workpiece initially at room temperature or with a preheat of the workpiece in the neighborhood of 250° F. This preheat may be of some assistance in maintaining the properties of the base metal itself and is not required to achieve the properties of the weld metal deposited in accordance with the present invention. This invention relates to an alloying process for the weld metal and accomplishes an automatic tempering of the weld metal deposit with the workpiece at ambient temperature before welding, and with normal ambient cooling rates. This welding process must be distinguished from, and does not relate in any manner to, the production of high strength alloy steel, wherein the alloying process involves controlling time, temperature and the composition, in a manner where the temperatures, cooling rates and other metallurgical determining factors are controlled to produce a preselected alloy having certain metallurgical and mechanical characteristics. Such controlled alloying process, as used in steel manufacturing, has no applicability to a welding process where the resulting alloy must be accomplished by relatively uncontrolled conditions and where the heat is controlled merely by the necessary temperature developed by the arc performing the welding process and by the rate at which the arc is moved along the workpiece. In accordance with the present invention, the novel deposited alloy is accomplished by an automatic tempering process. Technology for producing high strength steel is well known, well documented, and clearly applicable for the base metal; however, this same alloying technology and metallurgical techniques are inappropriate and inapplicable to the relatively uncontrolled, random time, temperature and deposition rate experienced in an arc welding process as used to deposit the novel alloy of the present invention.

The primary object of the present invention is the provision of a weld metal alloy and method of depositing same, which alloy has a low diffusible hydrogen, less than about 2.0 ppm, to allow a higher level of manganese and producing a desired martensitic form with high yield strengths without losing the notch toughness or decreasing the crack resistance. In accordance with this object of the invention, the manganese can be increased to over 3.0% to obtain yield strengths in excess of 100,000 psi. Indeed, as the manganese increases in accordance with the present invention, the yield strength increases. In practice, the manganese can be increased in the alloy of the novel alloy of the weld bead to approximately 4.0% to obtain a yield strength in excess of 130,000 psi. Thus, one of the basic objects of the present invention is the provision of an alloy for the weld metal in the deposited bead, which alloy has an extremely high manganese level. In addition, the level of nickel in the alloy is substantially decreased to a value of less than about 2.0%. Consequently, the relationship between the manganese and nickel to increase the yield strength is the reverse of the procedure generally employed in alloying of high strength steel. In accordance with the present invention, it has been determined that use of manganese to increase the yield strength is more beneficial in weld metal alloys than is the use of nickel. In addition, some of the deleterious effects of nickel are reduced by this aspect of the present invention, which emphasizes increased levels of manganese and decreased levels of nickel for purposes of increasing yield strength.

Another object of the present invention is the provision of a novel high yield strength alloy for use in a weld metal bead, which alloy can be produced by an arc welding process having a welding heat input of less than about 130 kJoules/in and indeed, in the range of 55-110 kJoules/in.

Another object of the present invention is the provision of an improved consumable welding element having the characteristics of the invention defined in the prior applications, incorporated by reference herein, which welding elements are modified to produce a unique steel alloy in the weld metal bead. This novel alloy produces characteristics of high strength, high notch toughness and low crack resistance, even for yield strength levels approaching 130,000 psi. This type of novel weld bead alloy has not heretofore been available.

In accordance with one aspect of the present invention there is provided a basic, metal cored electrode which can be employed for MIG welding of high yield strength steels exceeding 100,000 psi or a cored filler wire for the same purpose. This element is provided with constituents producing the inventive weld metal alloy. The invention can use consumable arc welding electrode or welding element, as shown in the prior applications, which comprise a steel sheath surrounding a compacted core containing metal alloying powder. This core also includes an essentially 100% basic compound in an amount less than about 1.6% of the total weight of the element, i.e. the electrode. The metal alloying powder employs standard technology to obtain the alloy composition of the resulting weld bead coming within the present invention. The basic compound provides a single ingredient fluxing agent while reducing the oxygen in the weld metal to a level less than about 0.04% of the weld metal. In accordance with the invention, the 100% basic compound is calcium fluoride powder.

In accordance with another aspect of the prior applications, which can be used in this invention, calcium fluoride powder is contained within the core at an amount between about 0.1% to about 0.9% of the total weight of the electrode. By having this low percentage of fluxing ingredients, namely calcium fluoride powder, welding problems with flux cored electrodes are overcome, while the calcium fluoride controls the amount of oxygen in the resulting weld metal.

In accordance with still another aspect of the prior applications, the basic, metal cored electrode includes a small amount of a polymer for reducing the amount of diffusible hydrogen in the weld metal. This polymer has a melting point less than about 1,000° F. so that it may be incorporated in the core material in particulate form and retain its composition during forming and drawing of the electrode. This agent releases the single fluxing agent, fluorine for the purpose of capturing diffusible hydrogen in the weld metal during the arc welding process. The polymer can be increased to 0.4% of the electrode weight. This results in a diffusible hydrogen of less than 1 ppm and as low as 0.6 ppm, a level of diffusible hydrogen never before obtainable. While the present invention may be employed in a solid metal wire electrode the hydrogen scavenging polymer can not.

In accordance with the primary aspect of the prior applications, which can be used for the welding element of the present invention, the basic metal cored electrode includes, as the single ingredient flux agent, calcium fluoride powder in the core in addition to the powder employed for hydrogen scavenging, such as a polymer containing fluorine. Metal alloying powder is also incorporated in the core with the single basic ingredient and the hydrogen scavenging polymer. The core is surrounded by a low carbon sheath which can be drawn into an electrode less than about 0.100 inches in diameter. Of course, it is conceivable that the sheath of the electrode could be formed in an electric alloying furnace to avoid the necessity for alloying metal powder in the core of a consumable electrode.

Whether the alloying metal is in an accurately controlled sheath metal or is controlled by metal alloying powder in the core, is not critical to this important feature of the prior applications. The alloying concepts technology and results can be modified in accordance with normal skill of the art to obtain the novel alloy of the present invention. However, a distinct advantage results from employing the alloying metals in the core to obtain the novel weld metal alloy of the present invention. Thus, an aspect of the present invention involves a basic metal cored electrode as taught in the prior applications but with the advantage of an optimal alloy system including controlled amounts of oxygen and diffusible hydrogen in the weld metal. Use of such electrode to obtain the novel alloy of the present invention has not been done. By this invention, MIG welding of extremely high strength steels has been accomplished, even in out of position welding.

In its practical implementation, the invention is a basic metal cored electrode; therefore, alloying metals for the weld metal bead are in powder form and compressed in the core. Of course, it is conceivable that the alloying materials could be incorporated into the surrounding sheath of the electrode if metallurgical accuracy can be obtained in the alloying of the sheath steel. In accordance with the preferred embodiment of the invention and in the most practical embodiment of the invention, a low carbon or low alloy steel sheath is employed for surrounding the core. The alloying metals to produce the desired weld metal alloy are incorporated as powder in the core. The electrode is drawn into the desired size which, preferably, is a cylinder less than 0.100 inches in diameter. The welding electrode can be employed for welding high yield strength steel, such as steel with yield strength of 102,000 psi (HY-100) and, even 130,000 psi (HY-130). In accordance with the prior applications, the basic metal cored electrode can be used to weld out-of-position since the calcium fluoride is at a controlled, limited maximum level, which is less than 1.60%, and this calcium fluoride constitutes the only fluxing constituent within or on the electrode.

The type of welding element defined in the prior applications incorporates alloying components to obtain the desired weld metal alloy in the weld bead. A specific weld metal alloy and method of depositing the same forms the present invention.

Prior attempts to obtain high yield strength with low or no preheat while maintaining good notch toughness and crack resistance have not been successful. The basic object of the present invention is to obtain a novel alloy and method of depositing the same, which accomplishes these characteristics.

This and other objects and advantages will become apparent from the following description taken together with the accompanying drawings.

PREFERRED EMBODIMENT

Figure 1:
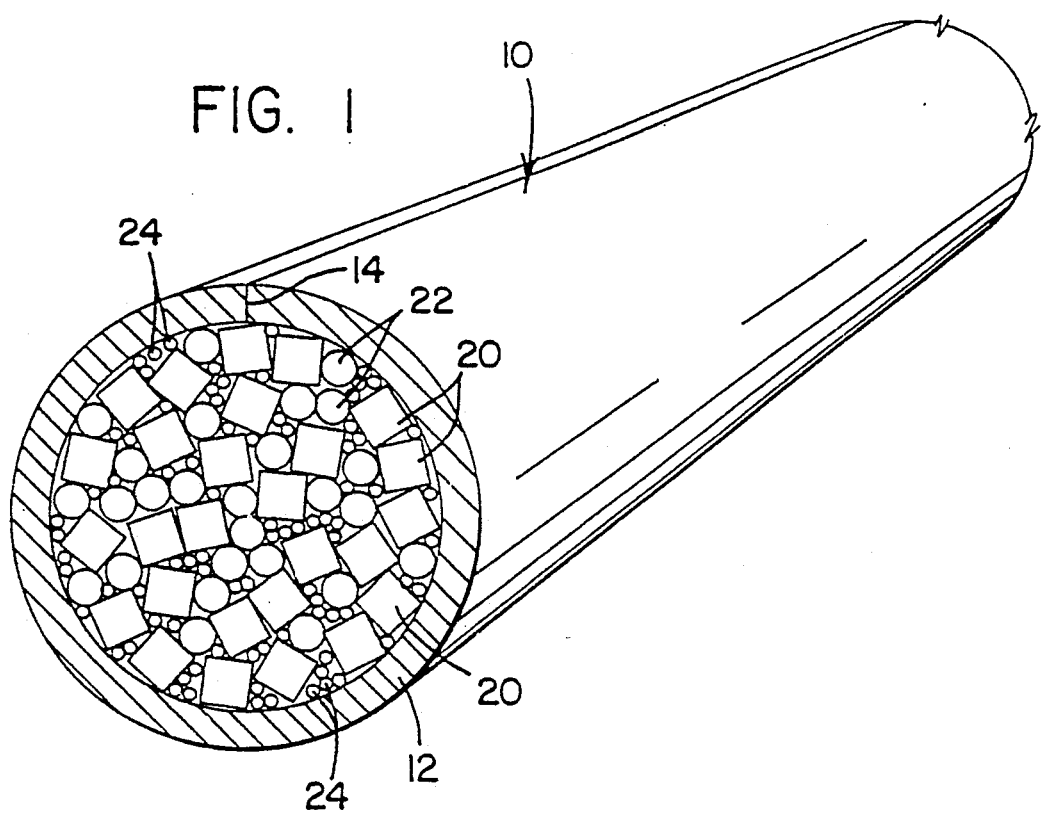
FIG. 1 is a schematic cross sectional view of a basic metal cored electrode that can be used to perform the present invention to obtain the novel weld metal alloy.

Referring now to the drawings wherein the showings are for the purpose of illustrating an example of the present invention. In this example, two plates one inch thick are welded with a shielding gas including 98% argon and 2% oxygen with a welding heat input of 55-110 kilojoules/inch with a preheat of the plates to a temperature of 250° F. The plates are formed from a high yield strength military steel HY-100. A basic metal cored electrode 10 was provided with an outer low carbon sheath 12 joined together at a seam 14, as schematically illustrated in FIG. 1. This figure shows features of the invention which will be described generally.

The seam 14 of sheath 12 may be overlapping or otherwise formed in accordance with standard practice for making welding rod 10. Within sheath 12 is a core compacted together and formed from particles 20 of alloying material (shown as squares) that are employed to obtain the desired and novel weld metal alloy of the present invention, calcium fluoride particles 22 (shown as large circles) and a small amount of polymer containing fluorine particles 24 (shown as small circles). This core is compacted by drawing electrode 10 to a diameter less than 0.100 inches. In this example, the polymer containing fluorine is 0.16% of the total electrode weight for Example X or 0.40% by weight for Example Y. (see FIG. 4). The percentage of total electrode weight for the calcium fluoride particles is 0.5%. The metal alloy particles 20 have a percentage of about 19% of the total weight of the electrode. The remaining weight is the sheath or yield strength military steel such as HY-100.

Figure 2:
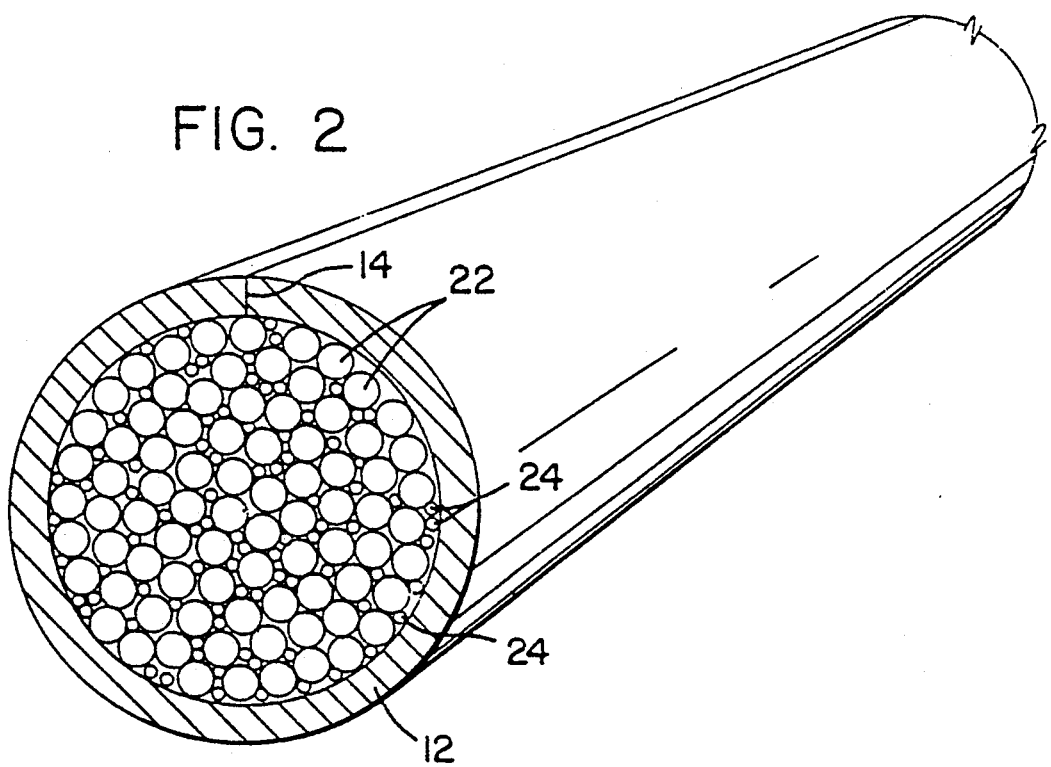
FIG. 2 is a cross sectional view of a modification of the electrode shown in FIG. 1.

FIG. 2 is a modification of the preferred embodiment of the invention wherein the core within sheath 12 includes only the calcium fluoride powder 22 and the hydrogen reducing agent powders 24. In this instance, the metal forming sheath 12 includes the alloying agents to produce the novel alloy of the present invention.

Figure 3:
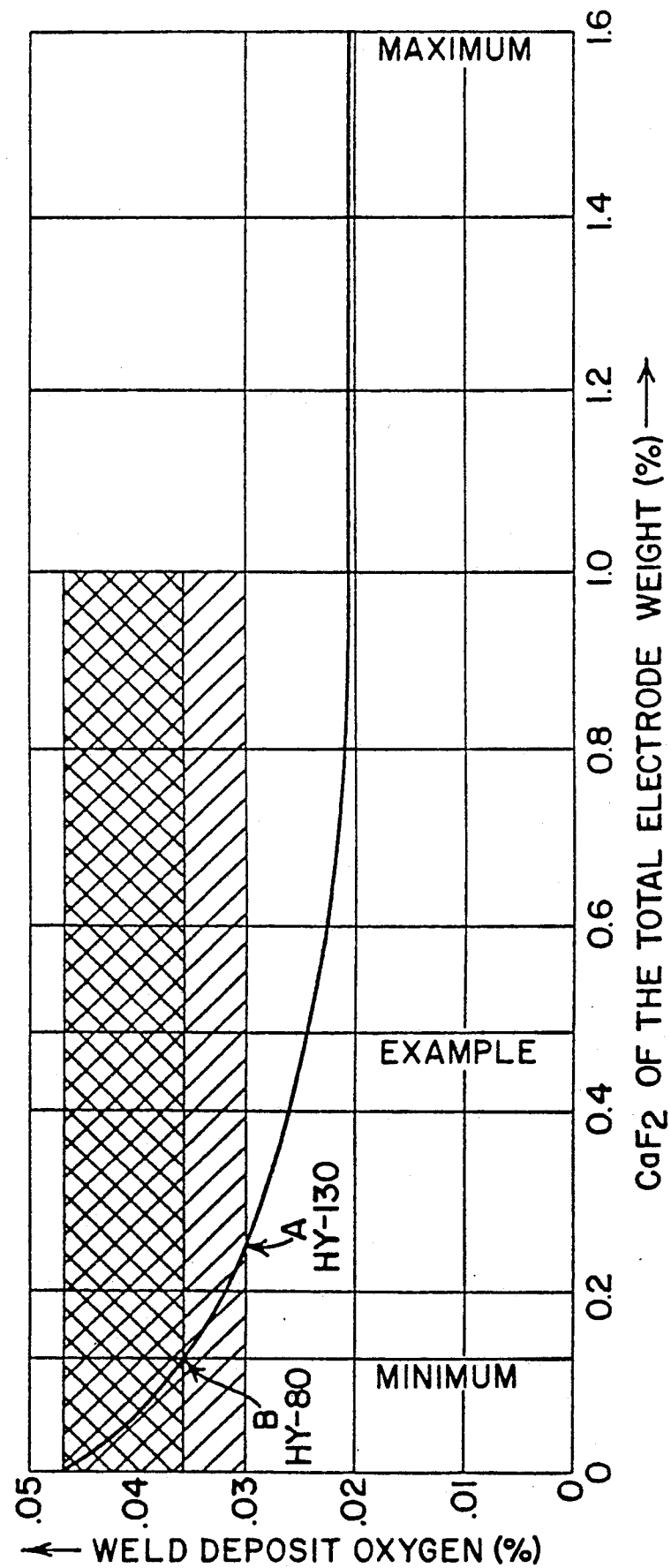
FIG. 3 is a graph illustrating the relationship between the basic composition of the electrode and the weld metal oxygen content.

Referring now to FIG. 3, the calcium fluoride particles within the core are less than about 1.6% of the total weight of the electrode. At 1%, or at a position near that amount calcium fluoride, the welding quality starts reducing its acceptability and a value over about 1.6% would result in a welding electrode not satisfactory for use in welding high yield strength steels in various welding positions. As the calcium fluoride decreases, the amount of oxygen in the weld deposit increases. As the yield strength of the high yield strength steel increases, a lesser amount of oxygen can be contained in the weld metal to meet military specifications and give acceptable impact strength. For high yield strength steel in the higher range, such as HY-130, the amount of included weld metal oxygen must be less than for high strength steel such as HY-80. Thus, the minimum level of calcium fluoride for HY-130 is at position X on the graph. For high strength steel with a lower strength, such as HY-80, the oxygen included in the weld metal can be slightly higher. This concept is illustrated at position Y on the graph. Thus, the minimum limit of calcium fluoride varies according to the yield strength of the high yield strength steel to which the invention is specifically applicable. In all instances, the weld metal alloy has a low oxygen content which is required for welding high yield strength steel. The ability to include more oxygen is only illustrated in FIG. 3 for the purpose of describing the invention and showing the minimum limits for the calcium fluoride needed in practicing the present invention.

Figure 4:
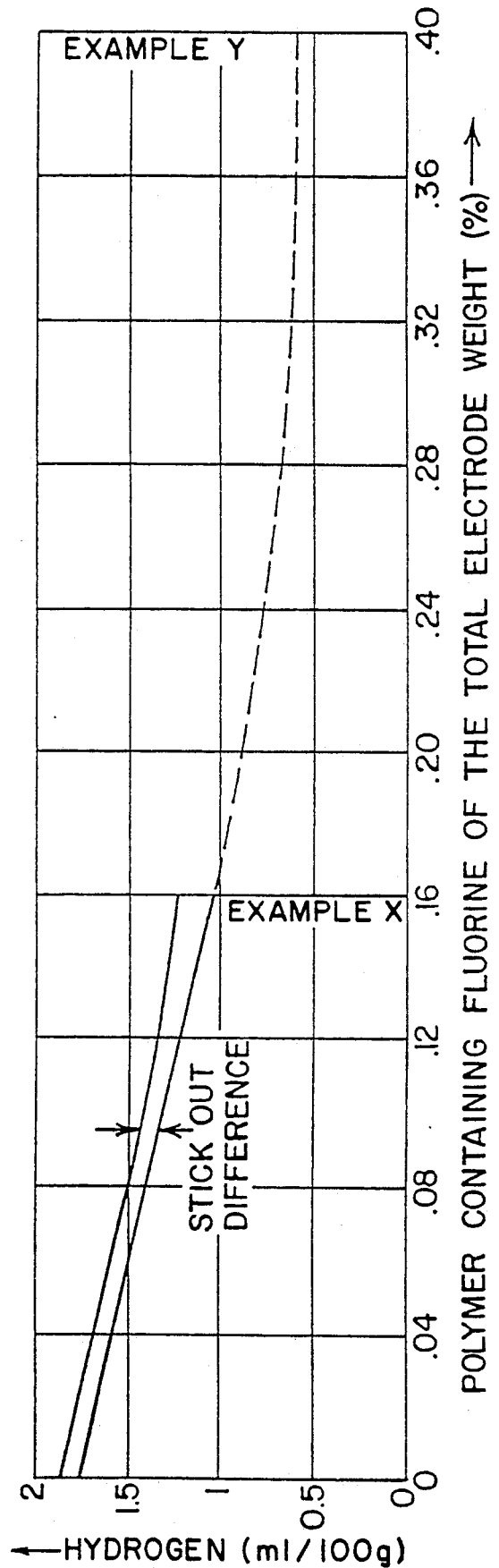
FIG. 4 is a graph showing the relationship between the percentage of a polymer containing fluorine of the total electrode weight and the of diffusible hydrogen in the weld metal; and, FIGS. 5 and 6 are a pair of graphs showing relationship of the alloying constituents present invention and yield strength of the weld metal as the relationship of welding heat input to the yield strength.

Referring now to FIG. 4, in this graph, the percentage of polymer containing fluorine, such as tetrafluoroethylene, is compared to the diffusible hydrogen found in the weld metal. The value for hydrogen is indicated by the parameter ml/100g which has a generally direct relationship with ppm. In practice, the high yield strength steels should have diffusible hydrogen less than 2.0 ppm. Hydrogen of less than 1.0 ppm has been generally unattainable except under extreme controlled conditions not applicable for use in the field. As can be seen, by incorporating calcium fluoride powder with the metal alloying powders, this objective of less than 2.0 ppm is reached, even without any hydrogen reducing agent.

Figure 5:
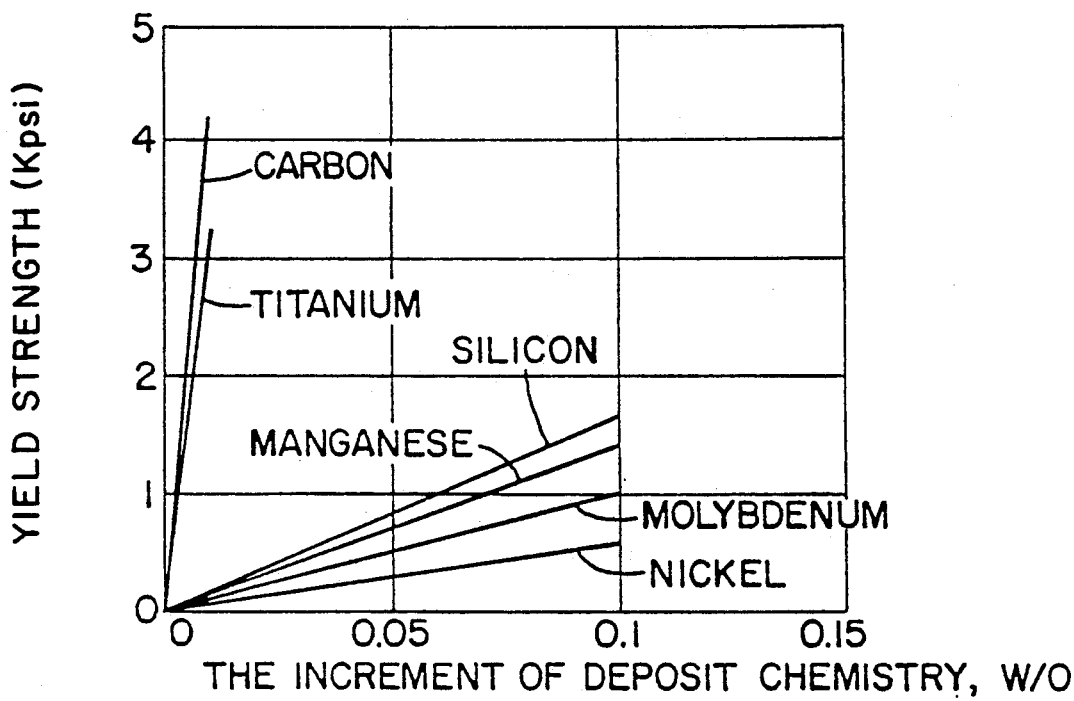
Figure 6:
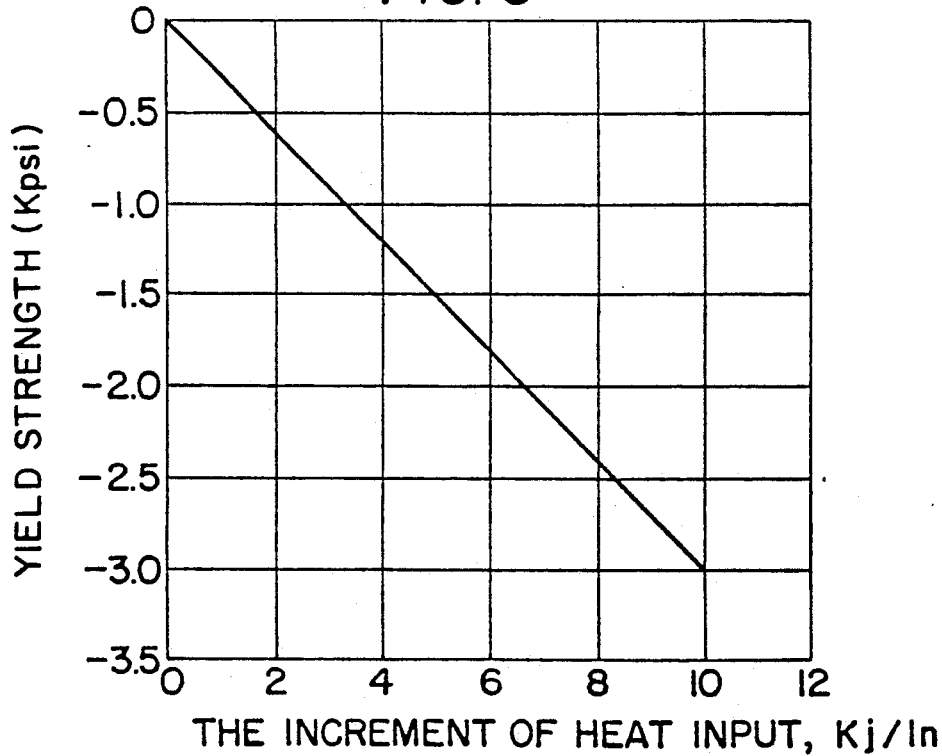

In FIG. 5, the left hand chart indicates the relationship of the constituents forming the alloy of the present invention, as they impact upon yield strength of the resulting weld metal alloy. Carbon and titanium are relatively critical in that minor deviations change the yield strength drastically. The slope of the curves define the relationship of the relative percentages of the constituents. In the right hand curve, the effect of welding heat input is illustrated. As the heat increases, the yield strength substantially decreases. At the bottom of FIG. 5 is a formula developed to explain the present invention. The constant 50.02 has been imperically derived, together with the slope of the curves shown in the two graphs. By applying the percentage of carbon, manganese, silicon, nickel, molybdenum and titanium, together with the welding heat input, the yield strength YS can be determined by use of the formula. This formula is advantageous in understanding the inventive concepts of the present invention. The invention relates to the alloying constituents of the deposited weld metal. Table I indicates 10 examples of the present invention with a deposited alloy having different percentages of carbon, manganese, silicon, nickel, molybdenum, and titanium. The resulting yield strength obtained by each example, together with the Charpy number at 0° F. is provided. Column E relates to the percentage of elongation for the individual weld metal alloys formed in accordance with the present invention.

TABLE I

| Ex | Welding Heat Input kJ/in | C % | Mn % | Si % | Ni % | Mo % | Ti % | Ys ksi | E % | CVN ft-Lbs |
|---|---|---|---|---|---|---|---|---|---|---|
| A | 110 | 0.050 | 2.82 | 0.29 | 1.05 | 0.77 | 0.013 | 105.6 | 22 | 70 |
| B | 55 | 0.048 | 2.96 | 0.31 | 1.24 | 0.76 | 0.016 | 124.0 | 20 | 60 |
| C | 110 | 0.053 | 2.88 | 0.30 | 1.23 | 0.62 | 0.017 | 103.1 | 23 | 74 |
| D | 55 | 0.052 | 3.06 | 0.33 | 1.03 | 0.68 | 0.022 | 121.1 | 22 | 77 |
| E | 85 | 0.051 | 3.22 | 0.34 | 1.44 | 0.80 | 0.018 | 120.8 | 22 | 64 |
| F | 55 | 0.054 | 3.30 | 0.36 | 1.35 | 0.82 | 0.022 | 130.3 | 20 | 42 |
| G | 75 | 0.070 | 3.08 | 0.39 | 1.48 | 0.78 | 0.019 | 133.5 | 20 | 52 |
| H | 55 | 0.068 | 3.18 | 0.36 | 1.25 | 0.85 | 0.021 | 139.1 | 19 | 48 |
| I | 85 | 0.066 | 3.72 | 0.40 | 1.69 | 0.93 | 0.019 | 137.0 | 19 | 41 |
| J | 55 | 0.065 | 3.74 | 0.41 | 1.54 | 0.97 | 0.021 | 145.6 | 19 | 35 |

The preferred embodiment of the present invention is Example C and D of Table I. In these examples a specific cored electrode was used to deposit weld metal onto a workpiece with an arc welding process using a welding heat input of 110 kJoules/in Example C or 55 kJoules/in Example D. The resulting alloying composition is set forth in Table I for both of these arc welding processes. The manganese for Example C is 2.88%, while the carbon is 0.053% and the titanium is 0.017%. This produced a yield strength of 103,100, psi with an elongation percentage of 23 and a Charpy number at 0° F. of 74. By reducing the welding heat input to 55 kJoules/in, the manganese is increased, the carbon remains substantially the same and the titanium is substantially increased. Referring now to the chart in FIG. 5 and the associated formula, the change produces a relatively abrupt increase in the yield strength to 121,000 psi. The effect of the difference in manganese between Examples C and D is less abrupt as shown in FIG. 5 and in Table I. The other preferred embodiment of the present invention is an electrode that produced Examples G and H shown in Table II. These two examples are the resulting alloy using the same electrode with different welding input heat. The major alloy difference is again in the titanium. The increased heat caused a reduction in the titanium and, thus, a substantially reduction in the yield strength. Each of the two pairs of successive examples in Table I are the same electrode but deposited with an arc welding process using different welding heat input. The preferred examples are the alloys of Examples C, D and the alloys of Examples G, H. As is well known in the welding art, certain alloying constituents are transferred from the electrode to the weld metal, with a lesser amount of loss through the arc or in the alloying procedure. This phenomena is well known in the arc welding field; therefore, a person skilled in the art could easily develop the alloying percentage in an electrode having the characteristics of the electrode in the prior applications to obtain the desired percentages set forth in Table I. For the preferred examples, Table II sets forth the percentage by weight of the electrode itself to obtain the deposit metal set forth in Table II.

TABLE II

| Electrode Compositions (%) | | |
| --- | --- | --- |
| | Examples C & D | Examples G & H |
| Calcium Fluoride | 0.55 | 0.50 |
| Fluoride containing polymer | 0.13 | 0.42 |
| Mg alloy | 0.05 | 0.03 |
| Si alloy | 0.45 | 0.46 |
| Ti alloy | 0.10 | 0.10 |
| Mn alloy | 3.69 | 3.82 |
| Ni alloy | 0.96 | 1.04 |
| Zn alloy | 0.09 | 0.04 |
| Mo alloy | 0.67 | 0.78 |
| Iron (includes C) | Remainder | Remainder |

In accordance with the present invention, after developing several electrodes in accordance with the teachings of the prior applications and perfecting the alloying compositions as set forth in Table II, it was determined that the alloy developed from a low hydrogen producing element and having the desired characteristics for use on a high strength steel workpiece would require the following composition.

| Alloying Elements | Weld Metal Percentages |
| --- | --- |
| Carbon | 0.03–0.09 |
| Manganese | 2.5–4.0 |
| Silicon | 0.2–0.6 |
| Nickel | 0.8–1.8 |
| Molybdenum | 0.5–1.3 |
| Titanium | .01–.05 |
| Oxygen | .015–.040 |

The primary constituents of the novel weld metal alloy are carbon, manganese and titanium. The carbon may come from both the sheath and from the alloying metal particles in the core. If the carbon is below 0.03, the alloy, contrary to popular belief, will lose notch toughness. This is a secondary consideration for maintaining carbon at least at the lower level of 0.03. The primary factor for maintaining at least this percentage of carbon is to increase the yield strength. If the carbon is above 0.09%, the crack sensitivity increases drastically and there is an unacceptable loss in the notch toughness. Thus, the novel alloying composition includes carbon in the range of 0.03–0.09%. Of the three primary constituents of the alloy, the high amount of manganese is of basic importance and is novel. In the past, manganese has generally been substantially below 2.0% in the weld metal. Indeed, the manganese was generally less than 1.0%. By reducing the hydrogen to less than 2.0 ppm, manganese can be increased over 2.0% and the nickel can be reduced. Thus, these two strength increasing components, manganese and nickel, are tuned in a manner to provide a lesser amount of carbide precipitation. Manganese has a lower tendency to cause such precipitation than does nickel. Thus, by reducing the amount of diffused hydrogen by a process, one of which is disclosed in the prior applications, manganese can be increased, while the nickel can be decreased. The manganese is employed in the range of 2.5–4.0%. As shown in FIG. 5, as the percentage of manganese increases, the yield strength is increased. Thus, the higher the yield strength which is to be obtained by the novel alloy, the more the amount of manganese is increased. Beyond 4.0% manganese, the crack resistivity is increased. Titanium is also a critical element in the trilogy of carbon, manganese and titanium. If the level of titanium is too low, there is low notch toughness and low yield strength. If the titanium is too high, i.e. about 0.05% the notch strength is reduced and crack resistivity is increased. Thus, it has been determined that titanium must be maintained in the range of 0.01–0.05%.

To the primary constituents of carbon, manganese and titanium, secondary alloying elements of silicon, nickel and oxygen are employed in the present invention. Silicon is a deoxidizer to eliminate porosity of the resulting weld metal; however, at a level above about 1.0% silicon causes the crack sensitivity to increase. For this reason, silicon is maintained in the general range of 0.2–0.6%. This range of silicon produces acceptable porosity while not increasing the crack sensitivity of the weld metal.

Referring now to the nickel in the novel alloy, as indicated before, nickel is maintained at a lower level than would normally be employed with manganese to control yield strength. Nickel is included for the purpose of maintaining notch toughness at the high strength levels. The nickel causes the microstructure to be less sensitivity to the cooling rate; however, it should not be included at a percentage greater than about 2.0%. If this upper level is exceeded, as is employed in steel making, carbide precipitation is increased. This lower nickel level promotes a reduction in crack sensitivity. Thus, the nickel must be below 2.0%, while the manganese is above 2.5%. This is a novel relationship for the two strength increasing components in the alloy formed by an arc welding process. As can be seen in FIG. 5, manganese has a higher contribution to yield strength than does nickel. Thus, the manganese is used to increase the yield strength, while the nickel is employed at low levels primarily to maintain notch toughness and control the microstructure of the grains so that the resulting alloy is properly tempered as it cools under ambient conditions following the welding process. This invention employs a small amount of oxygen. The oxygen is included in the range of 0.015–0.040%, but is preferably less than about 0.035%. By including at least about 0.02% oxygen, the oxygen stabilizes the microstructure and controls the type of grains in the resulting alloy for the purposes of increasing notch toughness of the resulting alloy. Above 0.04% oxygen causes an increase in impurities of the alloy and also reduces the notch toughness. Below about 0.015%, there is a loss in notch toughness. The oxygen helps to the microstructure of the novel alloy. A higher oxygen level than defined in the invention causes the notch toughness to decrease.

Molybdenum is an optional constituent in the alloy. The alloy can obtain a yield strength between 85,000–90,000 psi without molybdenum; however, to obtain a yield strength in excess of 100,000 psi, the molybdenum must be included. Molybdenum will cause some carbide precipitation which is detrimental and should be maintained in the range of 0.5–1.5%.

By producing an alloy for the weld metal deposited by an arc welding process having the percentage range set forth in the present invention, high tensile strength is obtained with the necessary physical and metallurgical characteristics.

We claim:

1. An improved high strength weld metal bead having a yield strength of greater than 85,000 psi which is produced from a consumable weld element with a welding heat input of less than about 130 k/Joules/in, said weld metal bead comprising diffusible hydrogen being less than 5.0 ml/100 g, and the following elements as a weight percentage of said weld metal bead, less than 0.040% oxygen, 0.03–0.09% carbon, 2.5–4.0% manganese, 0.01–0.05% titanium, less than 1.0% silicon, and less than 2.0% nickel.

2. The improvement defined in claim 1 wherein said silicon is in the range of 0.2–0.6%.

3. The improvement as defined in claim 2 wherein said nickel is in the range of 0.8–1.8%.

4. The improvement as defined in claim 3 wherein said oxygen is in the range of 0.015–0.035%.

5. The improvement as defined in claim 4 wherein said weld metal includes molybdenum of less than 1.5%.

6. The improvement as defined in claim 5 wherein said molybdenum is in the range of 0.5–1.3%.

7. The improvement as defined in claim 2 wherein said weld metal includes molybdenum of less than 1.5%.

8. The improvement as defined in claim 7 wherein said molybdenum is in the range of 0.5–1.3%.

9. The improvement as defined in claim 1 wherein said nickel is in the range of 0.8–1.8%.

10. The improvement as defined in claim 9 wherein said oxygen is in the range of 0.015–0.035%.

11. The improvement as defined in claim 10 wherein said weld metal includes molybdenum of less than 1.5%.

12. The improvement as defined in claim 11 wherein said molybdenum is in the range of 0.5–1.3%.

13. The improvement as defined in claim wherein said oxygen is in the range of 0.015–0.035%.

14. The improvement as defined in claim 13 wherein said weld metal includes molybdenum of less than 1.5%.

15. The improvement as defined in claim 14 wherein said molybdenum is in the range of 0.5–1.3%.

16. The improvement as defined in claim 1 wherein said weld metal includes molybdenum of less than 1.5%.

17. The improvement as defined in claim 16 wherein said molybdenum is in the range of 0.5–1.3%.

18. The improvement as defined in claim 16 wherein said nickel is in the range of 0.8–1.8%.

19. An improved high strength weld metal bead having a yield strength of greater than 100,000 psi which is produced from a consumable weld element with a welding heat input of less than about 130 k/Joules/in, said weld metal bead comprising diffusible hydrogen being less than 2.0 ml/100 g, and the following elements as a weight percentage of said weld metal bead, less than 0.040% oxygen, 0.03–0.09% carbon, 2.5–4.0% manganese, 0.01–0.05% titanium, less than 1.0% silicon, less than 2.0 nickel, and less than 1.5% molybdenum.

20. The improvement defined in claim 19 wherein said silicon is in the range of 0.2–0.6%.

21. The improvement as defined in claim 19 wherein said nickel is in the range of 0.8–1.8%.

22. The improvement as defined in claim 19 wherein said oxygen is in the range of 0.015–0.035%.

23. The improvement as defined in claim 19 wherein said molybdenum is in the range of 0.5–1.3%

24. An improvement high strength weld metal bead having a yield strength of greater than 100,000 psi which is produced from a consumable weld element with a welding heat input of less than about 130 k/Joules/in, said weld metal bead comprising diffusible hydrogen being less than 5.0 ml/100g, and the following elements as a weight percentage of said weld metal bead, less than 0.040% oxygen, less than 0.10% carbon, 2.5–4.0% manganese, 0.01–0.05% titanium, less than 1.0% silicon, less than 2.0% nickel, and less than 1.5% molybdenum.

25. The improvement defined in claim 24 wherein said silicon is in the range of 0.2–0.6%.

26. The improvement as defined in claim 24 wherein said nickel is in the range of 0.8–1.8%.

27. The improvement as defined in claim 24 wherein said oxygen is in the range of 0.015–0.035%.

28. The improvement as defined in claim 24 wherein said molybdenum is in the range of 0.5–1.3%.

29. A method of depositing a weld metal bead onto a steel workpiece said method comprising the steps of:
  (a) selecting a welding element to give a weld metal with diffusible hydrogen in the weld meal less than 2.0 ppm, and an alloy composition including 0.03–0.09% carbon, 2.5–4.0% manganese, 0.01–0.05% titanium, silicon less than about 1.0%, nickel less than 2.0%, and oxygen less than 0.035%, all percentages by weight of said weld metal;
  (b) using an electric current to create an arc for melting said element for deposition onto said workpiece; and,
  (c) moving said element as it is being melted along said workpiece at a rate to create a welding heat input less than about 130 kJoules/in.

30. The method as defined in claim 29 wherein said silicon is in the range of 0.2–0.6%.

31. The method as defined in claim 29 wherein said nickel is in the range of 0.8–1.8%.

32. The method as defined in claim 29 wherein said oxygen is in the range of 0.015–0.035%.

33. The method as defined in claim 29 wherein said weld metal includes molybdenum of less than 1.5%.

34. The method as defined in claim 33 wherein said molybdenum is in the range of 0.5–1.3%.

* * * * *